Oct. 18, 1949.  L. A. POPE  2,485,410
GERMICIDE LAMP INSTALLATION
Filed Dec. 29, 1945
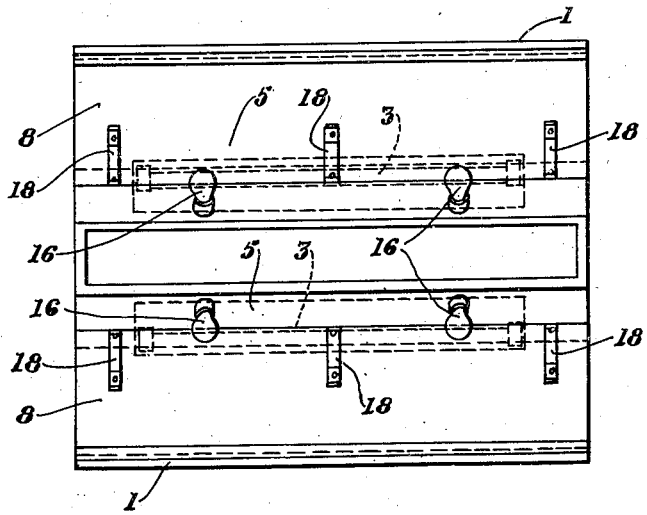
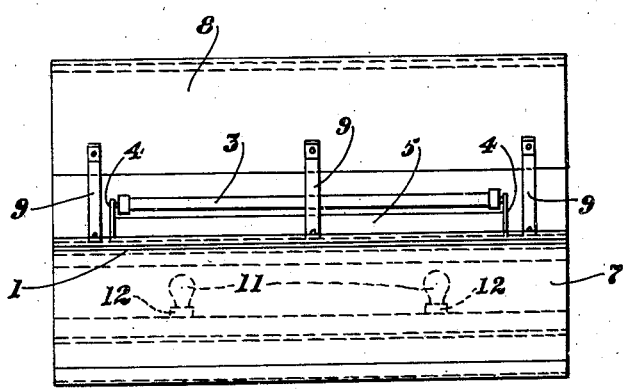
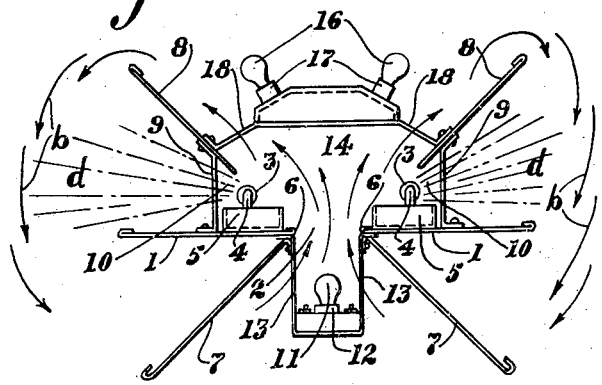
INVENTOR.
Louis A. Pope
BY Heard Smith Tennant
Attorneys Patented Oct. 18, 1949

2,485,410

UNITED STATES PATENT OFFICE 2,485,410

GERMICIDE LAMP INSTALLATION

Louis A. Pope, Melrose, Mass.

Application December 29, 1945, Serial No. 638,067

2 Claims. (Cl. 250—88)

This invention relates to germicide lamp installations. Germicide lamps are constructed to project germ-destroying light rays which kill germs that are subjected to the direct action of said rays, and the germicide lamps now commonly used are of the fluorescent type designed to project ultra-violet rays.

In installing germicide lamps of this type precautions are usually taken to shield the occupant of the room from the direct impact of the ultra-violet rays projected from the lamp because of the deleterious action such rays have on the human vision.

The efficiency of a germicide lamp, however, depends upon the amount of air in the room which is subjected to the direct germ-killing rays from the lamp tube.

It is, therefore, one object of my present invention to provide novel means for causing circulation of the air in the room through the zone receiving the direct germ-destroying rays from the germicide lamp, so that while the lamp is in operation there will be a continuous circulation of air in the room through said zone, thereby eventually bringing all the air in the room under the influence of the direct germ-destroying rays from the lamp.

In accordance with my invention, I accomplish this end by constructing a germicide lamp installation which comprises novel means associated with the germicide lamp to provide an air-circulating passage, some portion of which is subjected to the direct germ-destroying rays from the lamp and thus constitutes a germ-destroying zone, and which also comprises heat producing means so located relative to the air-circulating passage that the rising movement of the air heated by said heating means will establish an air current through said passage and thus through said germ-destroying zone. The continued movement of the air in a room through said passage will eventually bring all the air into a position to be acted on by the direct rays of the germicide lamp and thus will free the air from germs.

While any suitable heat-producing means may be employed for thus establishing the air circulation, a convenient form of such heat-producing means is an incandescent lamp such as commonly used for illuminating purposes because such an incandescent lamp not only provides the necessary heat for circulating the air, but also provides illumination for the room in which the installation is located.

In order to give an understanding of my invention, I have illustrated in the drawings some selected embodiments thereof which will now be described after which the novel features will be pointed out in the claims.

In the drawings:

Fig. 1 is a top plan view of a germicide lamp installation embodying my invention.

Fig. 2 is a side view thereof.

Fig. 3 is an end view.

The germicide lamp installation shown in Figs. 1–3 comprises two horizontally arranged supporting plates 1 which are preferably located in the same plane in parallel relation and are spaced from each other to provide between them an elongated air-circulating space or passage 2. Each plate 1 supports one or more germicide lamps 3, each lamp being of the tubular fluorescent type and being shown as supported in usual sockets 4 carried by chambered base 5 containing the wiring, ballast, and other necessary parts for the operation of the fluorescent tube 3. These lamps will preferably be located on the supporting plates 1 relatively near their inner edges and they extend longitudinally of the plates and substantially parallel to the elongated passage 2.

Extending downwardly and outwardly from the inner edge 6 of each supporting plate 1 is a combined shielding and reflecting plate 7, the under surface of each plate 7 having light-reflecting characteristics. These plates 7 may be secured to the supporting plates 1 by any suitable means and they extend longitudinally thereof.

8 indicates two additional plates which are located above the lamp-supporting plates 1 and are spaced therefrom, each plate 8 extending upwardly and outwardly. These plates 8 are secured to the supporting plate 1 by means of suitable straps 9. The space 10 between each supporting plate 1 and the plate 8 above it provides a passage through which direct ultra-violet germ-destroying rays are projected horizontally from the germicide lamps 3.

The germicide lamps 3 will be so located with reference to the air-circulating passage 2 and the reflecting plates 7 and supporting plates 1 that the tubes 3 themselves will not be visible to a person located beneath the fixture and hence a person so located will be shielded from the direct rays from said tubes 3.

Situated between the reflecting plates 7 and below the supporting plates 1 are one or more incandescent illuminating lamps 11, each lamp being carried by a suitable socket 12 which may be held in position by means of supporting straps 13.

In using the installation both the illuminating lamps 11 and the germicidal lamps 3 may be operated at the same time. When the lamps 11 are lighted, the air heated by said lamps will tend to rise through the air-circulating passage 2 and will thus establish an upward current of air through said passage 2, said air passing into the space or zone 14 between the germicide lamp tubes 3 and thus being subjected to the direct germ-killing rays from said lamps. This upward movement of air through the passage 2 and zone 14 will produce a continuous circulation of air such as indicated by the arrows in Fig. 3 which will involve a downward movement of air on opposite sides of the installation as indicated by the arrows b. The air which thus moves downwardly at each side of the installation passes through a side zone indicated at d into which direct rays from the germicide lamps 3 are projected. The air which passes up through the passage 2 and central zone 14 is subjected to the direct ultra-violet rays from the lamps 3 during its upward movement through said zone and then as the air continues its circulation, it again passes through another zone indicated at d in which it again is subjected to the direct rays from the lamps 3.

As the germicide lamps 3 and the illuminating lamps continue in operation, there will be such a circulation of air throughout the room that substantially all the air in the room will be eventually passed through one or more of the zones receiving the direct germ-killing rays from the lamp 3 and thus all the air in the room will be purified. Much of the air will be twice subjected to the direct germ-destroying rays from the lamps 3 each time it travels through a complete circuit of its circulatory movement, once when it passes upwardly through the central zone 14 and a second time when it moves downwardly through one of the side zones d.

The incandescent lamp or lamps 11 serve not only as means for establishing this air circulation, but they also provide illumination for the room, the reflecting surfaces of the reflecting plates 7 serving to increase the illuminating effect.

If desired, I may employ one or more additional incandescent lamps 16 above the zone 14 which furnish additional heat for assisting in maintaining the air circulation and which also furnish additional illumination. Where such additional lamps 16 are employed, the upper surfaces of the plates 8 may have reflecting characteristics so as to reflect the light from the lamps 16 on to the ceiling thereby increasing the indirect lighting effect of said lamps. These lamps 16 may be carried by suitable sockets 17 which may be held in desired position by means of straps 18 or other supporting means.

The fixture comprising the plates 1, 7 and 8 may be made of any desired length according to the size of the room in which the fixture is to be installed.

I have, therefore, provided a novel germicide lamp installation in which the air in the room in which the installation is located is caused to circulate through a zone or zones receiving the direct germ-killing rays from the germicide lamp by heating the air and thus establishing an upward current of heated air through said zone or zones. In the preferred embodiment of my invention, the air is heated by an element which produces both heat and light, such for instance, an incandescent bulb, but the invention is not limited to a heat-producing element of this type as any heat-producing means which will operate to establish the upward current of air through the germ-killing zone would be within my invention.

I claim:

1. A germicide lamp installation comprising two separate horizontally extending lamp-supporting plates arranged in parallel relation and occupying the same horizontal plane and spaced from each other to provide between them an elongated unobstructed air-circulating passage, a germ-destroying lamp tube mounted on the upper side of each plate near its inner edge and extending longitudinally thereof, said lamp tubes providing between them an unobstructed central zone which is subjected to the direct germ-destroying rays from said lamps, a shielding plate extending downwardly and outwardly from the inner edge of each lamp-supporting plate and also extending longitudinally thereof, said lamp-supporting plates and shielding plates being positioned to shield a person beneath the installation from any direct rays from the germ-destroying tubes including those rays projected into said air-circulating passage, said installation being open at both sides above the lamp-supporting plates thereby providing two side zones, one at each side of the installation, through which said germicide lamps project direct germ-destroying rays, and heat-producing means situated below the lamp-supporting plates and between the shielding plates by which an upward current of air is established through said air-circulating passage and through said unobstructed central zone and a resultant downward movement of air through the side zones, whereby the circulating air is subjected to the action of the direct germ-destroying rays from the germicide lamps during both its upward and its downward movement.

2. A germicide lamp installation comprising two horizontally extending lamp-supporting plates occupying the same horizontal plane and arranged in parallel relation and spaced from each other to provide between them an elongated unobstructed air-circulating passage, a germ-destroying lamp tube mounted on the upper side of each plate and extending longitudinally thereof, said lamp tubes forming between them an unobstructed central zone which is subjected to the direct rays of said lamps, said installation being open at both sides above the lamp-supporting plates, thereby providing two side zones, one at each side of the installation, through which are projected the direct germ-destroying rays from the germicide lamps, a combined light-reflecting and shielding plate extending downwardly and outwardly from the inner edge of each lamp-supporting plate and also extending longitudinally thereof, said lamp-supporting plates and combined reflecting and shielding plates being positioned to shield a person beneath the installation from any direct rays from the germicide lamps including those that are projected into said air-circulating passage, and an illuminating light source situated below the lamp-supporting plates and between the combined light-reflecting and shielding plates, the heat from said illuminating light source producing an upward current of air through said air-circulating passage and through said unobstructed central zone and a resultant downward movement of air through the side zones, whereby the circulating air is subjected to the action of direct germ-destroying rays from the germicide lamps both during its upward movement through the central zone and its downward movement through the side zones, and the light from said illuminating light source being reflected downwardly by the reflecting plates and serving to illuminate the area beneath the installation.

LOUIS A. POPE.

REFERENCES CITED

The following references are of record in the file of this patent:

UNITED STATES PATENTS

| Number | Name | Date |
|---|---|---|
| 1,976,545 | Doane | Oct. 9, 1934 |
| 2,198,867 | Fair et al. | Apr. 30, 1940 |
| 2,215,634 | Collins et al. | Sept. 24, 1940 |
| 2,215,635 | Collins | Sept. 24, 1940 |
| 2,350,462 | Johns | June 6, 1944 |

FOREIGN PATENTS

| Number | Country | Date |
|---|---|---|
| 546,005 | Great Britain | June 23, 1942 |